(12) United States Patent
Weng et al.

(10) Patent No.: US 10,718,206 B2
(45) Date of Patent: Jul. 21, 2020

(54) METHOD FOR INTERPRETATION OF DISTRIBUTED TEMPERATURE SENSORS DURING WELLBORE OPERATIONS

(71) Applicant: SCHLUMBERGER TECHNOLOGY CORPORATION, Sugar Land, TX (US)

(72) Inventors: Xiaowei Weng, Fulshear, TX (US); Pierre Ramondenc, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 115 days.

(21) Appl. No.: 15/119,625

(22) PCT Filed: Feb. 18, 2015

(86) PCT No.: PCT/US2015/016357
§ 371 (c)(1),
(2) Date: Aug. 17, 2016

(87) PCT Pub. No.: WO2015/126929
PCT Pub. Date: Aug. 27, 2015

(65) Prior Publication Data
US 2017/0067335 A1 Mar. 9, 2017

Related U.S. Application Data

(60) Provisional application No. 61/941,316, filed on Feb. 18, 2014.

(51) Int. Cl.
*E21B 47/06* (2012.01)
*E21B 47/10* (2012.01)
*E21B 43/25* (2006.01)
*G01K 11/32* (2006.01)

(52) U.S. Cl.
CPC ............ *E21B 47/065* (2013.01); *E21B 43/25* (2013.01); *E21B 47/10* (2013.01); *E21B 47/1005* (2013.01); *G01K 11/32* (2013.01)

(58) Field of Classification Search
CPC ........ E21B 43/25; E21B 47/065; E21B 47/10; E21B 47/1005; E21B 47/123
See application file for complete search history.

(56) References Cited

U.S. PATENT DOCUMENTS 7,055,604 B2   6/2006  Jee et al.
8,146,656 B2   4/2012  Brown
(Continued)

OTHER PUBLICATIONS

Tan et al., "Diagnosis of Acid Placement from Temperature Profiles", SPE Production & Operations, vol. 27, No. 03, Aug. 1, 2012; pp. 284-293.
(Continued)

*Primary Examiner* — Caroline N Butcher
(74) *Attorney, Agent, or Firm* — Cathy Hewitt

(57) ABSTRACT

A method for determining a flow distribution of a wellbore during a wellbore treatment comprises disposing an optical fiber into a wellbore, performing a wellbore treatment in the wellbore with the fiber optic in place by flowing a well treatment fluid from the surface and wellbore and into the formation, taking distributed temperature measurements at a time interval with the fiber optic cable during the wellbore treatment operation, and calculating a flow distribution of the wellbore while performing the wellbore treatment.

19 Claims, 5 Drawing Sheets

(56) References Cited

U.S. PATENT DOCUMENTS

| | | |
|---|---|---|
| 8,788,251 B2 | 7/2014 | Weng et al. |
| 2007/0068672 A1 | 3/2007 | Jalali et al. |
| 2007/0234789 A1 | 10/2007 | Glasbergen et al. |
| 2010/0207019 A1 | 8/2010 | Hartog et al. |
| 2011/0226469 A1 | 9/2011 | Lovell et al. |
| 2011/0288843 A1* | 11/2011 | Weng ............... E21B 47/1005 703/10 |
| 2012/0213525 A1 | 8/2012 | Ullah |
| 2013/0087388 A1* | 4/2013 | Veeningen ............ E21B 47/06 175/48 |
| 2014/0251601 A1* | 9/2014 | Wang ................. E21B 47/065 166/250.01 |
| 2016/0186554 A1* | 6/2016 | Burgos .............. E21B 41/0035 166/250.01 |

OTHER PUBLICATIONS

Glasbergen et al., "Real-Time Fluid Distribution Determination in Matrix Treatments Using DTS", SPE Production & Operations, Feb. 1, 2009, pp. 135-146.
Wang, "The Uses of Distributed Temperature Survey (DTS) Data", Aug. 31, 2012; 231 pgs.
Extended European Search Report issued in European Patent Appl. No. 15752744.1 dated Sep. 29, 2017; 9 pages.
International Search Report and Written Opinion issued in International Patent Application No. PCT/US2015/016357 dated Jun. 1, 2015; 13 pages.
Examination Report issue din European Patent Appl. No. 15752744.1 dated Oct. 29, 2018; 7 pages.

\* cited by examiner

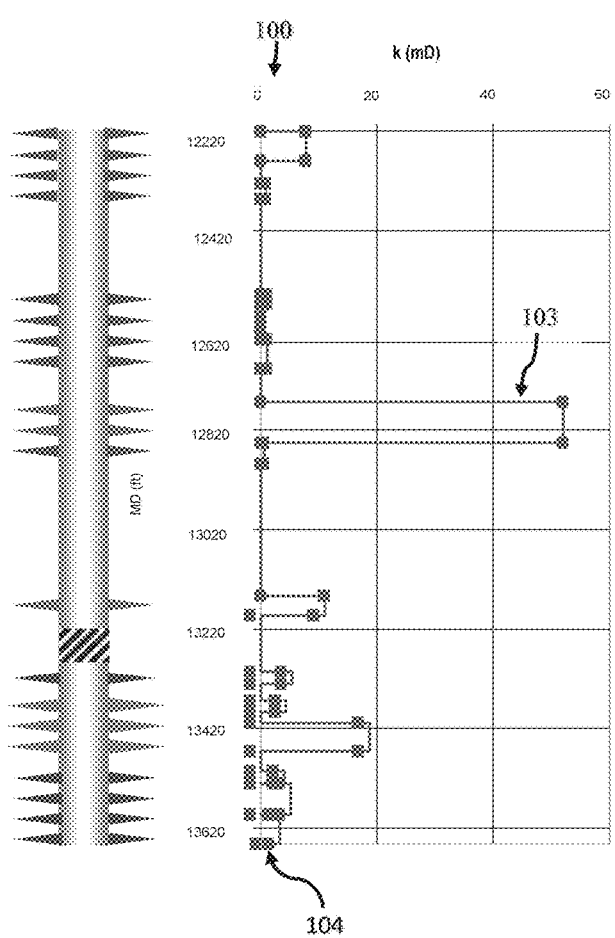 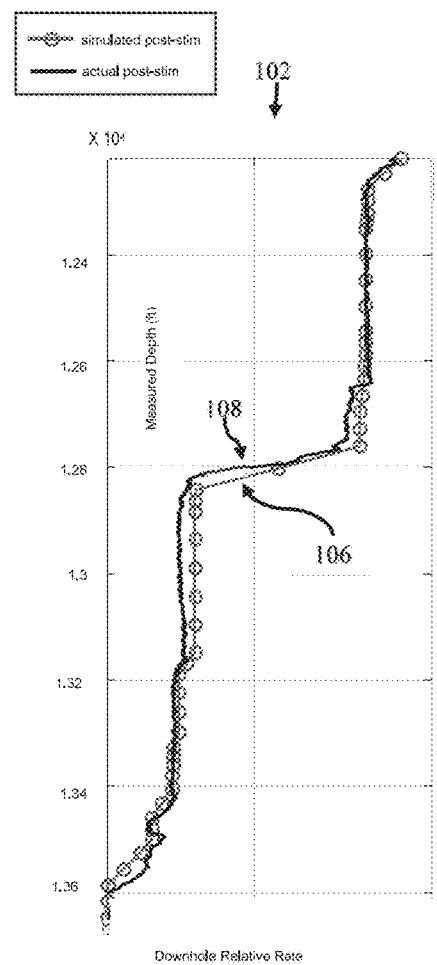
FIG. 1a
FIG. 1b

METHOD FOR INTERPRETATION OF DISTRIBUTED TEMPERATURE SENSORS DURING WELLBORE OPERATIONS

CROSS-REFERENCE TO RELATED APPLICATIONS

The present application is a 35 U.S.C. § 371 National Phase of International Patent Application No. PCT/US2015/016357 filed on Feb. 18, 2015, which claims priority to provisional application Ser. No. 61/941,316, entitled "Method for Interpretation of Distributed Temperature Sensors During Wellbore Operations" and filed on Feb. 18, 2014, the entire disclosure of each of which are incorporated by reference herein in their entireties.

BACKGROUND

The present disclosure is related in general to wellsite equipment such as oilfield surface equipment, downhole assemblies, and the like.

The statements made herein merely provide information related to the present disclosure and may not constitute prior art, and may describe some embodiments illustrating the invention. All references discussed herein, including patent and non-patent literatures, are incorporated by reference in their entirety into the current application.

Coiled tubing is a technology that has been expanding its range of application since its introduction to the oil industry in the 1960's. Its ability to pass through completion tubulars and the wide array of tools and technologies that can be used in conjunction with it make it a very versatile technology.

Typical coiled tubing apparatus includes surface pumping facilities, a coiled tubing string mounted on a reel, a method to convey the coiled tubing into and out of the wellbore, such as an injector head or the like, and surface control apparatus at the wellhead. Coiled tubing has been utilized for performing well treatment and/or well intervention operations including, but not limited to, hydraulic fracturing, matrix acidizing, milling, perforating, and the like.

Hydraulic fracturing, matrix acidizing and other types of injection operations are performed in oil and gas wells to enhance hydrocarbon production, or to reduce or seal unwanted production of water from certain zones. The wells being treated often consist of a large section of perforated casing or open borehole that has significant variation in rock petrophysical and mechanical properties. As a result of these different properties, a treatment fluid pumped into the well may not flow to all desired layers that need to receive the treatment fluid. Stimulation fluid may enter the most permeable layer (or uppermost layer) in the well and quickly remove formation damage and increase the injectivity, causing the remaining treatment fluid to go to the same layer while leaving other layers untreated. To achieve effective treatments, diverting agents, which can be chemical or particulate materials, may be used during the treatment to help reduce the flow into the more permeable layers that no longer need treatment fluid and increase the flow into the lower permeability layers. In addition, mechanical diversion devices, such as packers or the like, may be utilized to assist in diversion.

While the use of diverters may help improve flow distribution into multiple layers, there may be no assurance that the diverter will always be effective, nor may there be knowledge about how much of the target interval has been effectively treated while the treatment is being conducted. To ensure an effective treatment, a direct or indirect real-time downhole measurement of flow distribution is desirable to help the operator determine when and where to apply the diverters and by how much.

Traditional flow measurement in a well may be performed with production logging using a flow meter to measure the hydrocarbon production rate or injection rate in the wellbore as a function of depth. Based on the logged wellbore flow rate, the production from or injection into each formation depth interval is determined as the change in the measured axial flow rate over that interval. This technique is suitable where the flow distribution in the well does not change over the time period when logging is conducted. Additionally, this technique requires the wellbore fluid to be either a hydrocarbon or water, as flow meters typically cannot be used in a corrosive environment, such as when acid is being utilized or acid has been pumped into the wellbore.

During a treatment, such as a stimulation treatment, the flow distribution in a well may change quickly due to either stimulation of the formation layers, which increases the layers' flow capacity, or temporary reduction in the layers' flow capacity as a result of diverting agents. To determine the effectiveness of stimulation or diversion in the well, an substantially instantaneous measurement that gives a "snap shot" of the flow distribution in a well is desired.

One technique for providing an instantaneous measurement is fiber optic Distributed Temperature Sensing (DTS) technology. With an optical fiber in the wellbore, either via a permanent fiber optic line cemented in the casing or placed in an intelligent completion device, or deployed using a coiled tubing or a slickline unit, the optical fiber may measure the temperature distribution along the optical fiber based on optical time-domain reflectometry (OTDR). The advantage of DTS technology or measurements is the ability to acquire in a short time interval the temperature distribution along the well without having to move the tool or toolstring as in traditional well logging, which may be time consuming. DTS effectively gives a snap shot of the temperature profile in the well. DTS has been utilized to measure temperature changes after a stimulation injection, from which the flow distribution can be qualitatively estimated.

The inference of flow distribution is based on the amount of temperature "warm-back" or "cool down" during the shut-in period after injecting a fluid whose temperature is typically different from the formation temperature. For instance, a formation layer that receives a greater fluid flow rate during the injection of a colder fluid warms back more slowly compared to a zone that receives little flow. When the injection fluid is a reactant, the analysis becomes more complicated because the reactant (e.g., acid) may generate heat when in contact with the formation. When the injection fluid is reactant, this may lead to competing temperature responses, with on the one hand cooling due to colder fluid being placed in the warmer formation, and on the other hand heating due to the acid-rock reaction.

While the DTS data collected during shut-in may be analyzed to infer the flow distribution during the preceding injection period, the acquisition time requested for the data to be interpretable may be longer (typically in the order of about two to three hours). In order to utilize the DTS interpretation results to help spot the diverters to achieve optimal flow distribution, the treatment may need to be broken into multiple injection cycles separated by shut-in periods to acquire DTS data to determine the flow evolution, potentially leading to extended job time.

It would be advantageous to be able to interpret the flow distribution from the DTS data during treatment, such as during pumping of the treatment fluid, so that actions can be taken immediately; this would reduce the shut-in periods to the strict minimum, if not avoiding them. A wellbore treatment technique that is utilized is the "bullheading" technique. In performing a bullheading treatment, DTS data may be acquired either using a fiber optic enclosed in a CT (in such a case, there is no flow down the CT pipe, as bullheading occurs in the CT-casing annulus), a slickline dedicated to DTS measurement, or with an optical fiber placed as part of a completion; in some cases, one can also take advantage of any fiber optic permanently placed in the completion to monitor the DTS traces. In those cases, the DTS data during pumping can be analyzed to infer the flow distribution.

It remains desirable to provide improvements in oilfield surface equipment and/or downhole assemblies such as, but not limited to, methods for analyzing and/or interpreting the results of wellbore treatments

SUMMARY

An embodiment for determining a flow distribution of a wellbore during a wellbore treatment, comprises disposing an optical fiber into a wellbore, performing a wellbore treatment in the wellbore with the fiber optic in place by flowing a well treatment fluid from the surface and wellbore and into the formation, taking distributed temperature measurements at a time interval with the fiber optic cable during the wellbore treatment operation, and calculating a flow distribution of the wellbore while performing the wellbore treatment. In an embodiment, the method further comprises adjusting at least one parameter of the wellbore treatment operation based on the calculated flow distribution. In an embodiment, disposing an optical fiber into a wellbore comprising disposing the fiber optic as a permanent installation in a wellbore completion. In an embodiment, disposing an optical fiber into a wellbore comprises deploying the optical fiber into the wellbore with a slickline. In an embodiment, disposing an optical fiber into a wellbore comprises deploying the optical fiber into the wellbore with a coiled tubing string. The fiber optic may be disposed in the flow path of the coiled tubing.

In an embodiment, performing a wellbore treatment in the wellbore comprising performing a stimulation operation. In an embodiment, performing a wellbore treatment in the wellbore comprising performing an acid treatment operation. In an embodiment, the wellbore treatment may comprise a perforating operation. In an embodiment, taking distributed temperature measurements at a time interval with the fiber optic cable during the wellbore treatment operation comprises taking the distributed temperature measurements at a predetermined time interval. In an embodiment, taking distributed temperature measurements at a time interval with the fiber optic cable during the wellbore treatment operation comprises taking the distributed temperature measurements at a random time interval.

In an embodiment, calculating a flow distribution of the wellbore comprises utilizing at least one of a heat exchange between wellbore fluid and a coiled tubing string, a fluid flow and temperature convection in the wellbore, a heat exchange between wellbore fluid and completion tubing and/or rock, a heat conduction into the rock, a fluid flow into permeable layers and associated heat convection, an exothermic reaction due to acid-rock reaction, and a Joule-Thomson effect.

In an embodiment, calculating a flow distribution of the wellbore comprises at least one of storing the computed fluid and temperature distribution in the rock from the previous time as initial condition for the current time step (or storing the previous rate/intake history), storing computed formation properties from the previous time as initial condition for the current time step (or storing the previous values/history), using an automated optimization algorithm for adjusting the flow rate distribution to match the predicted temperature profile with DTS measurement and account for the overall temperature evolution during injection, and using supplemental shut-in DTS data to adjust flow rate distribution and match predicted temperature profile with DTS measurement.

In an embodiment, taking distributed temperature measurements at a time interval with the fiber optic cable during the wellbore treatment operation comprises taking enough traces to enable averaging of the results from the successive time intervals. The method may further comprise recalculating the flow distribution when a new DTS trace is available.

In an embodiment, the method may further comprise dividing the wellbore into small elements or depth intervals, and calculating a flow distribution for each of the small elements or depth intervals. In an embodiment, adjusting at least one parameter of the wellbore treatment operation comprises changing a pumping rate or a type of treatment fluid, an ingredient of the treatment fluids, a volume of treatment fluid, a pumping method and a sequence of the treatment fluid. The treatment fluid ingredients may comprise an acid or a diverter. In an embodiment, adjusting at least one parameter of the wellbore treatment operation comprises changing the coiled tubing position in the subsequent treatment, either for delivery of treatment fluid, or for facilitation of better interpretation of the acquired data. The pumping method may comprise bullheading or double injection through a coiled tubing interior and an annulus of the coiled tubing.

In an embodiment, the method may further comprise determining, after taking distributed temperature measurements, if the flow distribution may be calculated and, if the flow distribution may not be calculated, determining an alternate course of action for determining the flow distribution.

BRIEF DESCRIPTION OF THE DRAWINGS

These and other features and advantages will be better understood by reference to the following detailed description when considered in conjunction with the accompanying drawings.

FIG. 1a is a schematic graph of a permeability profile for use in an embodiment of the method according to the present disclosure.

FIG. 1b is a schematic graph of a flow profile for use in an embodiment of the method according to the present disclosure.

DETAILED DESCRIPTION

Figure 2:
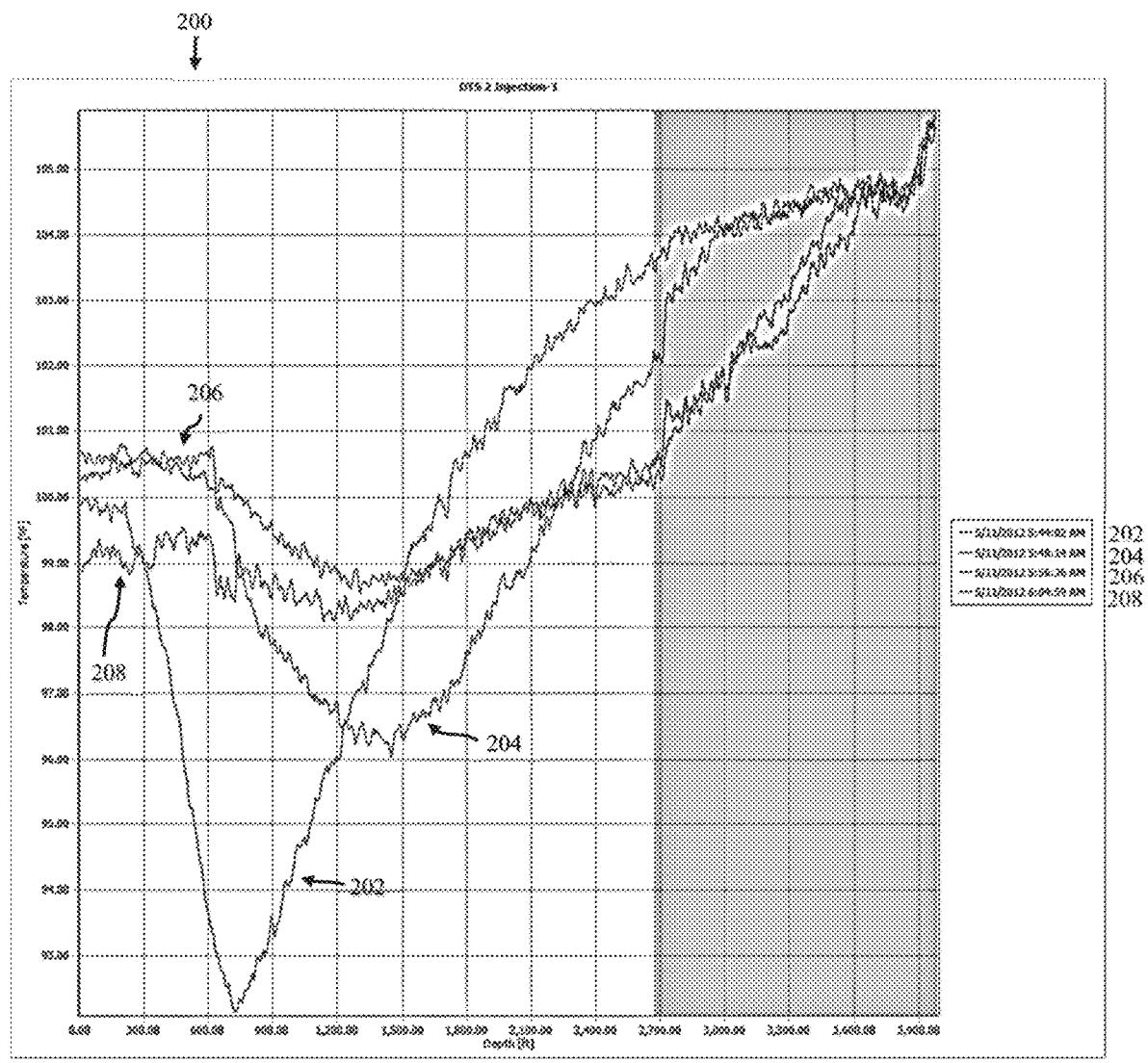
FIG. 2 is a schematic graph of temperature profiles for use in an embodiment of the method according to the present disclosure.

Disclosed herein are embodiments of methods for an automated and continuous quantitative interpretation of distributed temperature sensing (DTS) data acquired while performing a treatment operation such as during pumping a treatment fluid during a well intervention operation. The interpretation is accomplished by continuously analyzing the differences between successive DTS "snap shots" of the temperature profile along the wellbore and using a computer model to determine the flow distribution that best matches the measured DTS data acquired during the treatment operation.

Embodiment of methods according to the present disclosure utilize DTS acquired during treatment, such as during pumping of the treatment fluid, by using an optical fiber or fibers disposed in an interior flow path of coiled tubing (wherein the treatment fluid may flow through either the annulus or through the coiled tubing interior), a slickline with optical fibers, dedicated to DTS measurement, or with an optical fiber placed as part of a completion in the wellbore. In these cases, the DTS data acquired during pumping (during a treatment operation) may be analyzed to infer the flow distribution.

When the DTS system acquires data during a wellbore treatment, such as during a wellbore injection or the like, embodiments of the method or methods disclosed herein gather and analyze successive discrete "snap shots" of DTS measurements to determine the evolution of the temperature profile over time.

There is shown in FIG. 1a a formation permeability profile of a wellbore, indicated generally at 100. The permeability profile 100 includes formation permeability values 104 at various wellbore depths. The wellbore shows a high permeability portion, indicated generally at 103 at around a measured depth of 12,820 feet, corresponding to a perforation in the wellbore. There is shown in FIG. 1b, a plot of the simulated flow 106 versus an actual measured flow 108. As can be seen in FIG. 1b, above the top perforation 103, the flow rate is the greatest and is substantially equal to the surface pumping rate. When crossing each permeable layer, including the perforation 103, some flow enters the permeable layer(s), thus reducing the total flow rate in the wellbore at that depth. The flow rate then becomes zero below the lowermost permeable layer that takes fluid or at a measured depth of about 13,620 feet. The formation layer that has the highest permeability 103 (FIG. 1a) has the greatest inflow, and consequently corresponds to the largest rate drop (FIG. 1b) across the layer 103.

The calculated temperature profile may be influenced by both the flow profile, as depicted in FIG. 1b, as well as heat exchange phenomena between the (typically) warmer rock and the (typically) cooler injection fluid. There is shown in FIG. 2, an example of the evolution of a temperature profile 200 between four successive times or "snap shots", at successive time intervals 202, 204, 206, and 208. Each of the time intervals 202, 204, 206, and 208 are temperature profiles of a bullheading injection operation, where fluid is pumped from the surface to the wellbore. The time interval 202 is the first time interval and the time interval 208 is the last time interval. As the cooler injection fluids travels down the wellbore, one can notice that the various temperature fronts feature different velocities and amplitudes at different depths, directly related to how much fluid goes into the formation, and how much heating the wellbore fluid receives from the formation around those depths. An open hole section of the wellbore is represented by the shaded area on the right side of FIG. 2, at a depth of greater than approximately 2,700 feet.

When a distinctive feature, such as a peak or valley, exists in the temperature profile, the distinctive feature may be used to determine the flow velocity at that depth based on how much distance it travels between the successive snapshots, as disclosed in U.S. patent application Ser. No. 13/196,707 by Brown, et. al., the entire disclosure of which is incorporated by reference herein in its entirety. However, this peak or distinctive feature may only provide very limited data points since such features get attenuated as they travel down the wellbore (e.g., due to thermal exchange with completion and the the formation) and every time they pass in front of an intake zone. Therefore, the distinctive features like temperature peaks or valleys or temperature fronts may not reach the end of long wellbore intervals while maintaining the distinguishable signature to be interpreted. In FIG. 2, one can note that at a greater depth (moving to the right of the graph of FIG. 2), the temperature feature originating from the wellhead (the temperature step on the left side of profile 202) has dissipated at later times 206 and 208. The same thing occurs for the lower-most temperature feature (the valley in profile 202). From the temperature profiles 202, 204, 206, and 208 shown in FIG. 2, it can be deduced that the method is more suitable for short intervals or for the upper part of longer ones.

In the present disclosure, an embodiment of a method is proposed, in which a temperature model is adopted to simulate the temperature evolution from measurement time, or t1, to a later measurement time, or t2. The temperature model may be similar to the model disclosed in U.S. patent application Ser. No. 12/785,142, by Weng et al, the entire disclosure of which is incorporated by reference herein in its entirety. The thermal model takes into account the various thermal exchange phenomena occurring between the injection fluid, the formation rock, the formation fluid, the completion tubing, the wellbore tubing, and, if present, the coiled tubing. In an embodiment, the properties of each permeable layer (such as the layer 103 shown in FIG. 1) may be adjusted until the model-predicted temperature profile at time t2 matches the DTS-recorded temperature profile (such as the temperature profiles 202, 204, 206, or 208 shown in FIG. 2) at that same time. In the more general case when the exact location of permeable layers is unknown (e.g., in the case of a horizontal open hole), the entire open wellbore interval may be divided into small elements or depth intervals, which may be analyzed separately. The inflow into each of the sub-divided elements or depth intervals may then be adjusted to achieve the match with the DTS data, and then compiled to ensure the sum of all those flow volumes corresponds to what was effectively pumped down the wellbore.

Given the dynamic nature of the injection of a treatment fluid in a formation, the model is expected to notice variations of the intake of the same zones over the course of the treatment or injection (e.g., a diverter would gradually diminish the intake, while acid would gradually increase it). Also, given the statistical nature of DTS measurements, it is important to consider several temperature traces in order to run an analysis. This is why the algorithm of the present disclosure may not only look at the temperature evolution between two time steps, but also over the course of a given time interval comprising several temperature traces.

The thermal model of the present disclosure used to simulate the temperature evolution takes into account, but is not limited to, at least one or more of the following variables and/or phenomena:

Heat exchange between wellbore fluid and the coiled tubing (CT)

Fluid flow and temperature convection in the wellbore

Heat exchange between wellbore fluid and completion tubing/rock

Heat conduction into the rock

Fluid flow into permeable layers and associated heat convection

Exothermic reaction due to acid-rock reaction

Joule-Thomson effect

Additionally, embodiments of methods according to the present disclosure presents at least one or more of the following features:

Storing the computed fluid and temperature distribution in the rock from the previous time as initial condition for the current time step (or storing the previous rate/intake history or storing the evolution of rock properties such as permeability)

Figures 3A, 3B:
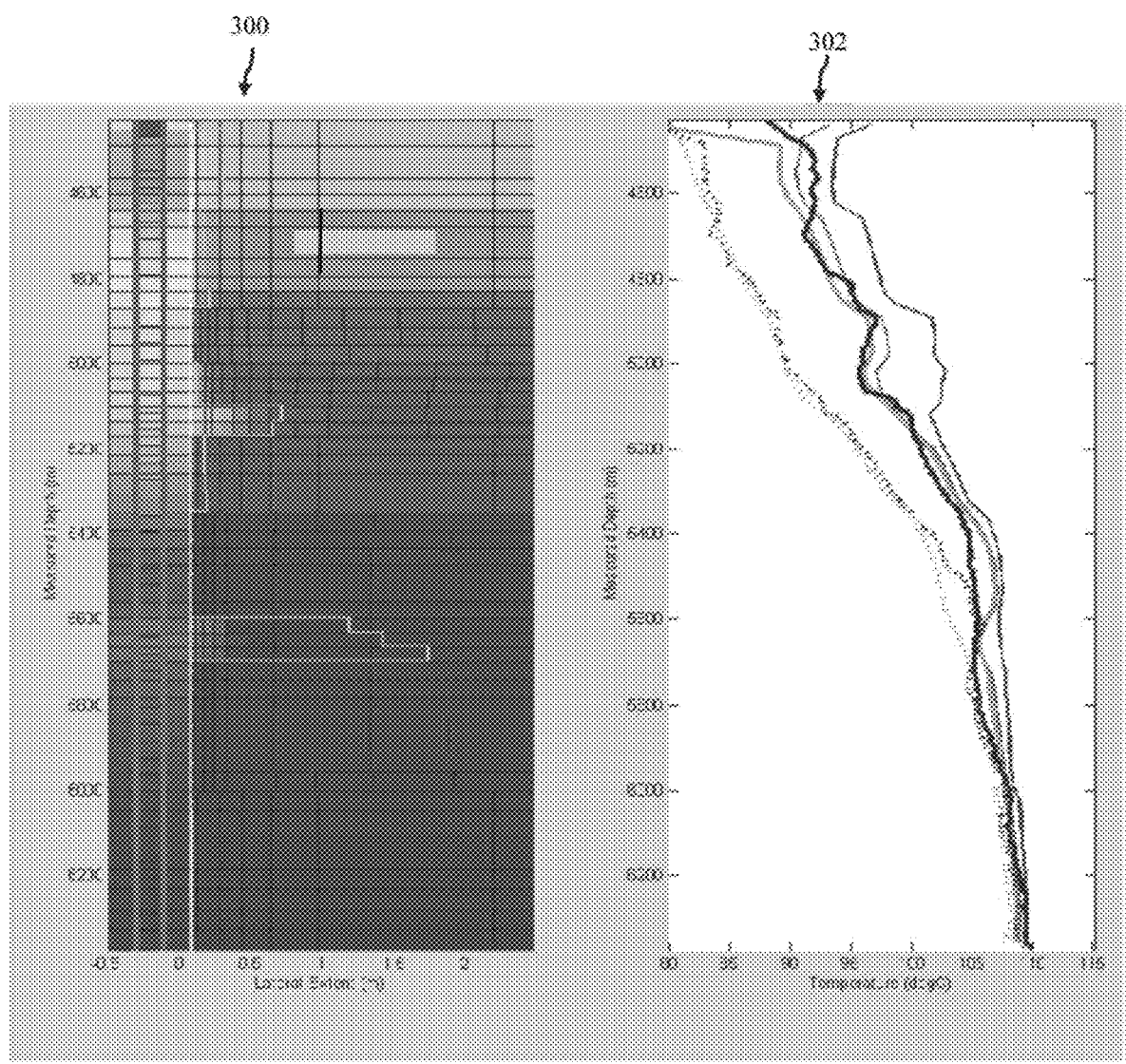
FIG. 3a is a schematic graph of an embodiment of the method according to the present disclosure.
FIG. 3b is a schematic graph of an embodiment of the method according to the present disclosure.

Using an automated optimization algorithm for adjusting the flow rate distribution and/or formation properties to match the predicted temperature profile with DTS measurement and account for the overall temperature evolution during injection Using supplemental shut-in DTS data to adjust flow rate distribution and match predicted temperature profile with DTS measurement There is shown in FIG. 3a an example of the simulated temperature distribution in the wellbore and rock grids, utilized for calculation purposes. The lighter shaded areas indicate lower simulated temperatures while the darker shaded areas indicate higher simulated temperatures, which represents an output 300 of the thermal model of the present disclosure. There is shown in FIG. 3b a plurality of temperature profiles in the wellbore, similar to the temperature profiles 202, 204, 206, and 208 of FIG. 2, at spaced-apart time intervals, which is utilized to update the model, as discussed hereinabove.

Figure 4:
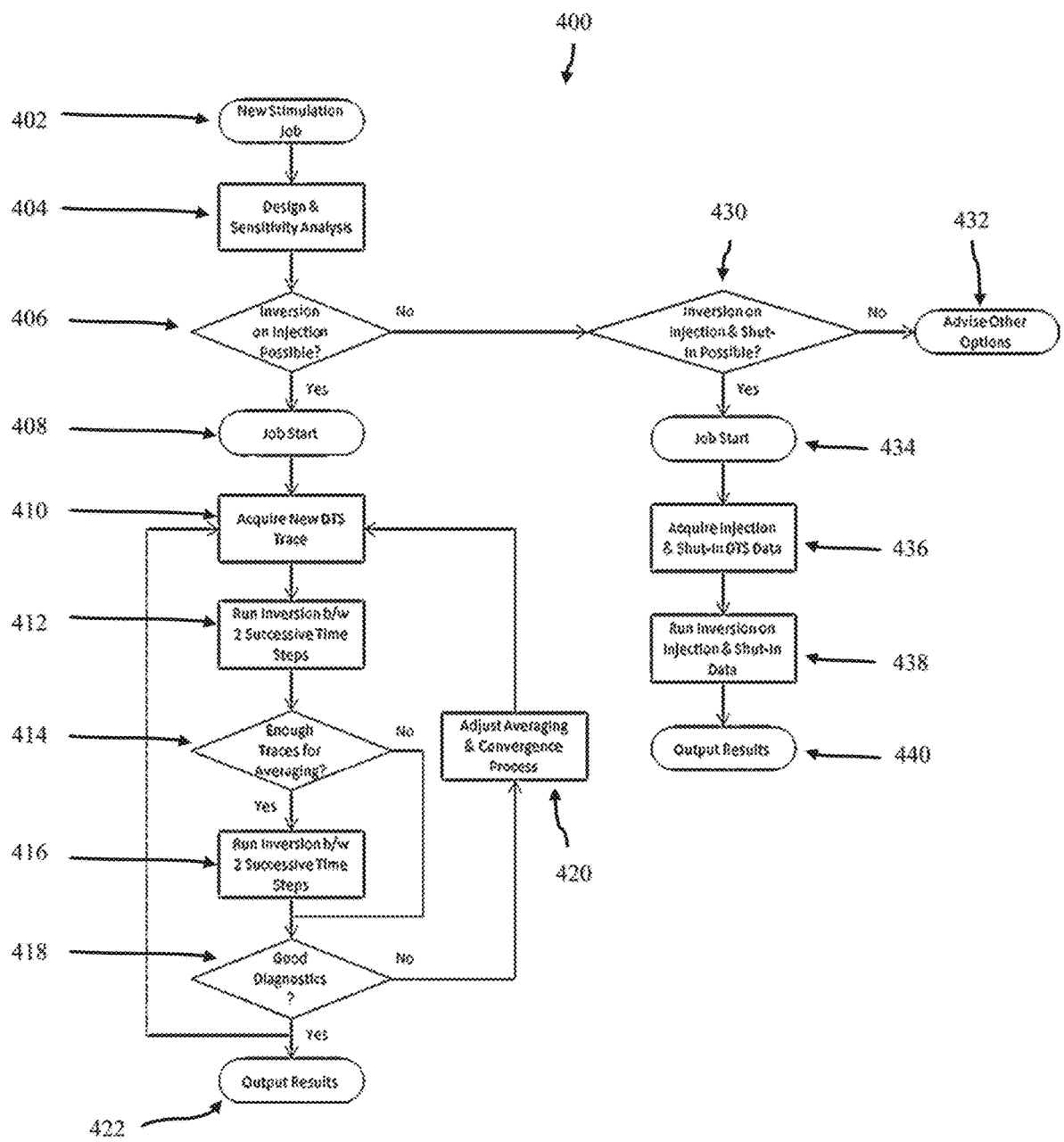
FIG. 4 is a flowchart depicting an embodiment of the method according to the present disclosure.

The overall workflow of the disclosed method is shown in FIG. 4 wherein an embodiment of a method of the present disclosure is indicated generally at 400. At 402, a new stimulation job or method commences, followed at 404 by a design and sensitivity analysis, after which, at 406, it is determined whether inversion or injection is possible with the method 400. If the injection is possible at 406, the job starts at 408. In 410, new DTS traces are acquired and at 412 an inversion is run between two successive time steps. At 414, it is determined if there are enough DTS traces for averaging. If there are enough DTS traces for averaging at 414, an inversion is run between two successive time steps at 416. If there are not enough DTS traces for averaging at 414, the method 400 proceeds directly to 418, where it is determined if there is good diagnostics. If there are not good diagnostics at 418, the averaging and convergence process is adjusted at 420 and the method returns to acquire new DTS trace(s) at 410. If there are enough DTS traces for averaging at 414 and after running an inversion between two successive time steps at 416, the method 400 proceeds to 418, where it is determined if there is good diagnostics. If there are not good diagnostics at 418, the averaging and convergance process is adjusted at 420 (as noted above) and the method 400 returns to acquire new DTS trace(s) at 410. If there are good diagnostics at 418, the method 400 either outputs results at 422 or acquires new DTS trace(s) at 410 and undergoes another iteration at 412, 414, 416, 418, and/or 420, as recited above.

If, at 406, it is determined that the inversion on DTS data during injection is not possible with the method 400, at 430 it is determined whether inversion on injection and shut-in data is possible. If inversion on injection and shut-in data is not possible at 430, the client is advised other options at 432.

If inversion on injection and shut-in is possible at 430, the job starts at 434. At 436, injection and shut-in data is acquired and an inversion is run on injection and shut-in data at 438, after which results are output at 440.

Figure 5:
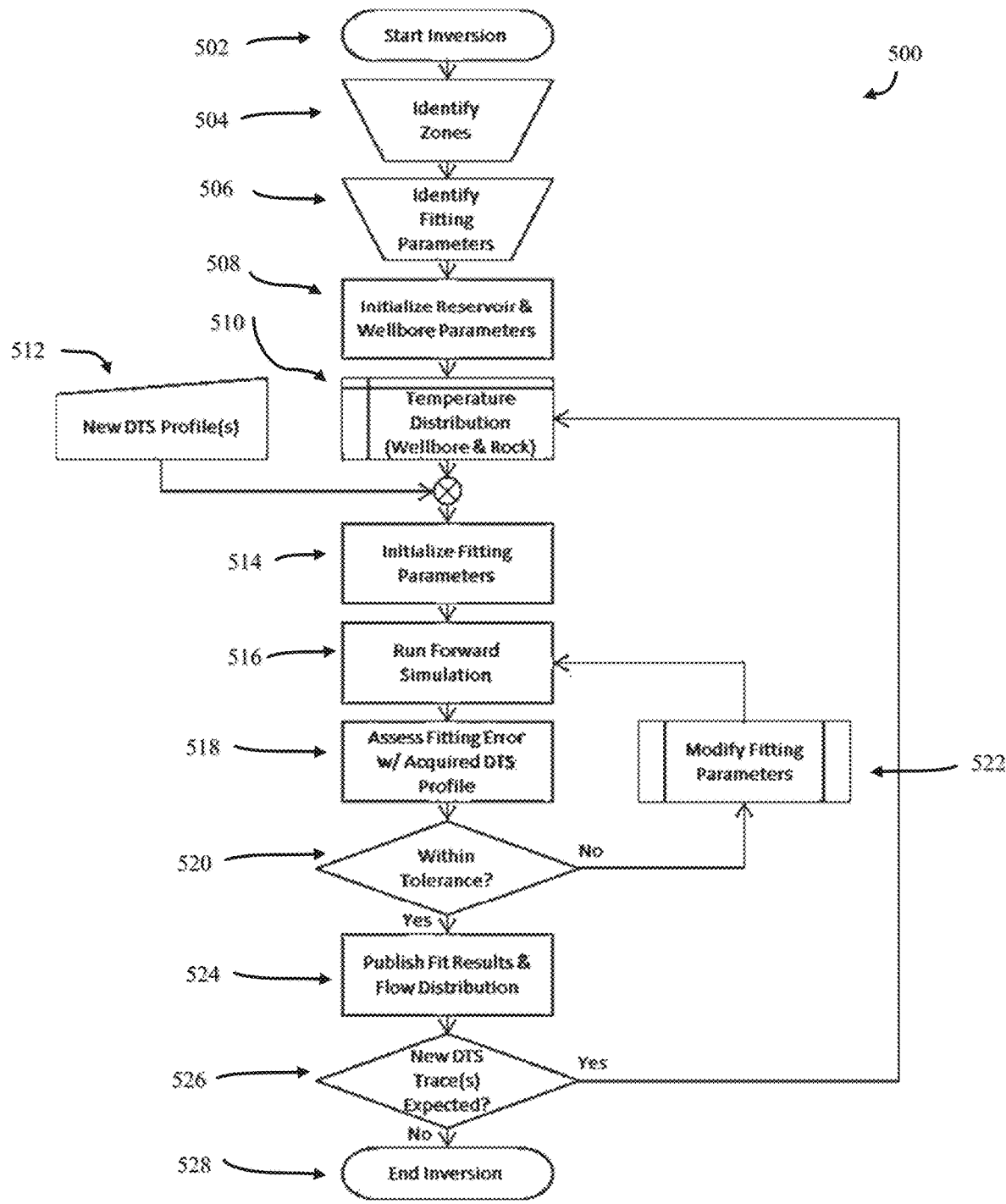
FIG. 5 is a flowchart depicting an embodiment of the method according to the present disclosure.

There is shown in FIG. 5 further details an embodiment of a method according to the present disclosure for the inversion process and how to obtain flow distribution out of the input DTS traces and the initial identification of reservoir and wellbore properties, indicated generally at 500. The method 500 begins at 502 where the inversion is started. At 504, layers or zones of different formation properties and/or completion characteristics are identified. At 506 fitting parameters for the temperature model are identified and at 508 reservoir and wellbore parameters are initialized. At 510, a temperature distribution for the wellbore and rock is calculated and/or performed. At 512, new DTS profile(s) are entered into the method 500 and at 514, the fitting parameters are initialized. At 516, a forward simulation is run and a fitting error (of the forward simulation 516) is assessed with the acquired DTS profile at 518. If the fitting error is within tolerance at 520, the fit results and flow distribution is published at 524 and if the fitting error is not within tolerance at 520, the fitting parameters are modified at 522 and the method 500 returns to run the forward simulation again at 516. At 526, if new DTS traces are expected, the method 500 returns to 510 to calculate and/or perform a temperature distribution for the wellbore and rock, and the method proceeds again through 514, 516, 518, 520, 524, 526, and/or 522. If no new DTS traces are expected the inversion and the method 500 ends at 528.

Note that the inversion process or method of the present disclosure may be flexible enough to operate on either a few DTS traces (i.e., assess the evolution of flow between two successive time steps) or a longer temperature history (i.e., several traces are the input to the algorithm, which will check the evolution through the provided temperature history. This would correspond to the aforementioned averaging process). The time intervals between the DTS traces may be predetermined or random or both.

The method of flow distribution determination disclosed herein applies to any time increment between two successive DTS snap shots. The snap shots may be taken during a well treatment operation. By repeating the process at each DTS acquisition or trace (such as at 410, 420, 510, 512, and 526), the flow evolution during the treatment may be observed in real time, and proper treatment actions and adjustments may be made to optimize the placement of the treating fluid. Due to the inherent nature of DTS measurements, the temperature data from the DTS traces may contain significant noise, which may lead to potential error or fluctuation in the interpreted and/or calculated flow distribution. By taking proper averaging of the results (such as at 420) from successive times and recalculating every time a new DTS trace is available ((such as at 410, 420, 510, 512, and 526), the noise and/or errors can be filtered out and/or reduced.

A full diagnostics of the inversion process convergence (such as at 418) may provide noteworthy information about whether the chosen averaging approach is sufficient to provide a trusted answer. In the case where the approach would not provide a trusted answer, the disclosed fitting algorithm would automatically switch to a different averaging of the data (such as at 420 and 522) and re-calculate inflow profiles in order to minimize convergence error, and thus increase the confidence in the interpreted flow distribution.

A flow determination from the temperature profile evolution may not always be possible. For example, when the flow rate of the well intervention operation is very high, convection may be so dominant that the treatment fluid is hardly heated up while travelling down the wellbore and its temperature becomes almost equal to the surface fluid temperature. In such an instance, there would be hardly any change in temperature profile in successive DTS measurements. The DTS information during pumping then would not yield determinable flow distribution. Similarly, when the flow rate of the well intervention operation is extremely low, the non-reactive fluid (i.e. not an acid) may be quickly heated up to the formation temperature, and again there would be no change in the successive DTS temperature profiles to allow interpretation of the flow distribution. The method proposed herein comprises a pre-job and design analysis using the afore-mentioned thermal model to simulate the conditions and/or depths where such interpretation is not feasible for the proposed treatment, such as at 406 and 430. During such an evaluation phase, one would explore the sensitivity of the designed job to various parameters, such as pumping rate, wellbore temperature, formation permeability contrasts. In turn, that study would provide the operator information about the limits under which the proposed method would provide satisfactory results (such as at 406), and whether including shut-in information would be advisable in order to run a successful quantitative analysis utilizing the DTS data.

In order to utilize the DTS interpretation results to help spot the diverters to achieve optimal flow distribution, the treatment may need to be broken into multiple injection cycles separated by shut-in periods to acquire DTS data to determine the flow evolution, potentially leading to extended job time. However, by utilizing the methods 400 and/or 500 an operator may utilize the output 422, 524 to determine if any action is needed to be taken with the treatment or intervention operation, which may reduce the shut-in periods on the operation to the strict minimum, if not avoiding them entirely. The diverter may comprise a mechanical diversion device(s), such as packers or the like, that may be utilized to assist in diversion.

The method 400 or 500 according to the present disclosure provides an estimation of a flow profile of a wellbore by measuring actual 'snapshots' of distributed temperature or DTS readings at successive time intervals and taking into account at least one or more of the following factors: heat exchange between wellbore fluid and CT; fluid flow and temperature convection in the wellbore; heat exchange between wellbore fluid and completion tubing/rock; heat conduction into the rock; fluid flow into permeable layers and associated heat convection; exothermic reaction due to acid-rock reaction; and Joule-Thomson effect in order to arrive at a predicted/estimated flow distribution for a wellbore. The factors are utilized when the inversion is run, such as at 416 and 516.

The preceding description has been presented with reference to present embodiments. Persons skilled in the art and technology to which this disclosure pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A method for determining a flow distribution of a wellbore during a wellbore treatment, comprising:
   disposing an optical fiber into a wellbore;
   performing a wellbore treatment in the wellbore with the optical fiber in place by flowing a well treatment fluid from the surface and wellbore and into the formation;
   taking distributed temperature measurements at a time interval with the optical fiber during the wellbore treatment operation while the well treatment fluid is flowing into the formation;
   calculating a flow distribution of the wellbore while the well treatment fluid is flowing into the formation based on the distributed temperature measurements; and
   adjusting calculation of the flow distribution using supplemental distributed temperature measurements taken during a shut-in of the wellbore.

2. The method according to claim 1 further comprising adjusting at least one parameter of the wellbore treatment operation based on the calculated flow distribution.

3. The method according to claim 2 wherein adjusting at least one parameter of the wellbore treatment operation comprises changing a pumping rate or a type of treatment fluid, an ingredient of the treatment fluids, a volume of treatment fluid, a pumping method, and a sequence of the treatment fluid.

4. The method according to claim 3 wherein the treatment fluid ingredients comprises an acid or a diverter.

5. The method according to claim 3 wherein the pumping method comprises bullheading or double injection through a coiled tubing interior and an annulus of the coiled tubing.

6. The method according to claim 2 wherein adjusting at least one parameter of the wellbore treatment operation comprises changing a coiled tubing position in the subsequent treatment, either for delivery of treatment fluid, or for facilitation of better interpretation of the acquired data.

7. The method according to claim 1 wherein disposing the optical fiber into the wellbore comprises disposing the optical fiber as a permanent installation in a wellbore completion.

8. The method according to claim 1 wherein disposing comprises deploying the optical fiber into the wellbore with a slickline.

9. The method according to claim 1 wherein disposing comprises deploying the optical fiber into the wellbore with a coiled tubing string.

10. The method according to claim 9 wherein the optical fiber is disposed in the flow path of the coiled tubing.

11. The method according to claim 1 wherein the wellbore treatment in the wellbore comprises performing a stimulation operation.

12. The method according to claim 1 wherein performing the wellbore treatment in the wellbore comprises performing an acid treatment operation.

13. The method according to claim 1 wherein taking distributed temperature measurements comprises taking the distributed temperature measurements at a predetermined time interval.

14. The method according to claim 1 wherein taking distributed temperature measurements comprises taking the distributed temperature measurements at a random time interval.

15. The method according to claim 1 wherein calculating the flow distribution of the wellbore comprises utilizing at least one of a heat exchange between wellbore fluid and a coiled tubing string, a fluid flow and temperature convection in the wellbore, a heat exchange between wellbore fluid and completion tubing and/or rock, a heat conduction into the rock, a fluid flow into permeable layers and associated heat convection, an exothermic reaction due to acid-rock reaction, and a Joule-Thomson effect.

16. The method according to claim 1 wherein calculating the flow distribution of the wellbore further comprises at least one of storing the computed fluid and temperature distribution in the rock from the previous time as initial condition for the current time step, storing computed formation properties from the previous time as initial condition for the current time step, and using an automated optimization algorithm for adjusting the flow rate distribution to match the predicted temperature profile with the distributed temperature measurements and account for the overall temperature evolution during injection.

17. The method according to claim 1 wherein taking distributed temperature measurements comprises taking distributed temperature sensing measurements at successive time intervals and averaging the measurements taken at the successive time intervals.

18. The method according to claim 17 further comprising recalculating the flow distribution after each successive time interval.

19. The method according to claim 1 further comprising dividing the wellbore into small elements or depth intervals, and calculating a flow distribution for each of the small elements or depth intervals.

\* \* \* \* \*